United States Patent [19]

Janninck

[11] 3,766,618

[45] Oct. 23, 1973

[54] COMPOSITE HOB
[75] Inventor: William Leo Janninck, Chicago, Ill.
[73] Assignee: Illinois Tool Works Inc., Chicago, Ill.
[22] Filed: Feb. 22, 1972
[21] Appl. No.: 228,119

[52] U.S. Cl. .............................................. 29/103 B
[51] Int. Cl. ...................................................... B26d
[58] Field of Search .......................... 29/103.2, 104; 90/11 B; 10/141; 408/215–220

[56] References Cited
UNITED STATES PATENTS
| | | | |
|---|---|---|---|
| 2,511,470 | 6/1950 | Johnson | 408/220 |
| 1,495,067 | 5/1924 | Conklin | 29/103 |
| 1,618,429 | 2/1927 | Head | 29/104 |
| 3,374,518 | 3/1968 | Bentjens | 29/103 |

FOREIGN PATENTS OR APPLICATIONS
| | | | |
|---|---|---|---|
| 564,078 | 9/1944 | Great Britain | 29/103 |

Primary Examiner—Andrew R. Juhasz
Assistant Examiner—W. R. Briggs
Attorney—Robert W. Beart et al.

[57] ABSTRACT

A compound hob having a plurality of separable sections including a roughing section and a trailing section. Each section including a plurality of cutting teeth arranged along a helix with the helix angle of the roughing section being the same as the helix angle of the finishing section. The roughing section being formed with a larger number of flutes and teeth than the trailing section.

5 Claims, 4 Drawing Figures

COMPOSITE HOB

BACKGROUND OF THE INVENTION

It has been known that on a gear generating hob the outer portions of the teeth or the region near the tips of the teeth do a large percentage of the metal removal work, and that the cutting edges near the base of the hob teeth do a minor part of the work. As a result of this observation, roughing hobs which provide partial depth cutting teeth, have been used to perform the major portion of the gear generation. This in most cases was to be followed by a secondary pass with a separate finishing hob. This method is extremely inconvenient and costly. Hobs have also been devised, such as those shown in U.S. Pat. Nos. 1,096,164 and 3,374,518, which provide an increased number of cutting edges by essentially placing varying depths of flutes about the helix of a hob. While this does provide a larger number of cutting edges than is found in a normal hob, it does so at the expense of a quite complicated and time consuming resharpening process. The plurality of different flute depths that are used in these techniques require separate setups for grinding passes made for each flute depth.

SUMMARY OF THE INVENTION

According to the present invention, a compound or multiple sectioned hob comprises a leading section, which functions as a roughing hob and a trailing section which functions as a finishing hob. The teeth on both the leading section and trailing section are formed on the same helix with the number of teeth in the leading section being greater than the number of teeth in the trailing section. The teeth in the leading section are of a shallow depth since the work done by the flanks of the hob tooth is a minor part of the total work.

The two sections are separably interlocked to allow a continuous transition from the roughing section to the finishing section.

DESCRIPTION OF THE PREFERRED EMBODIMENT

Figure 1:
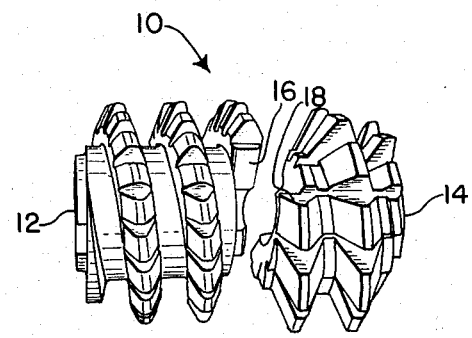
FIG. 1 is a perspective view of the composite roughing and finishing hob with the two sections separated to show the interlocking mating surfaces.

Referring to FIG. 1 there is shown a composite hob 10 which includes a roughing or leading section 12 and a trailing or finishing section 14. The teeth on each section are formed along a common helix. In operation, the two sections are interlocked by surfaces 16 and 18 so that there is a smooth transition from the leading section to the trailing section.

Figure 2:
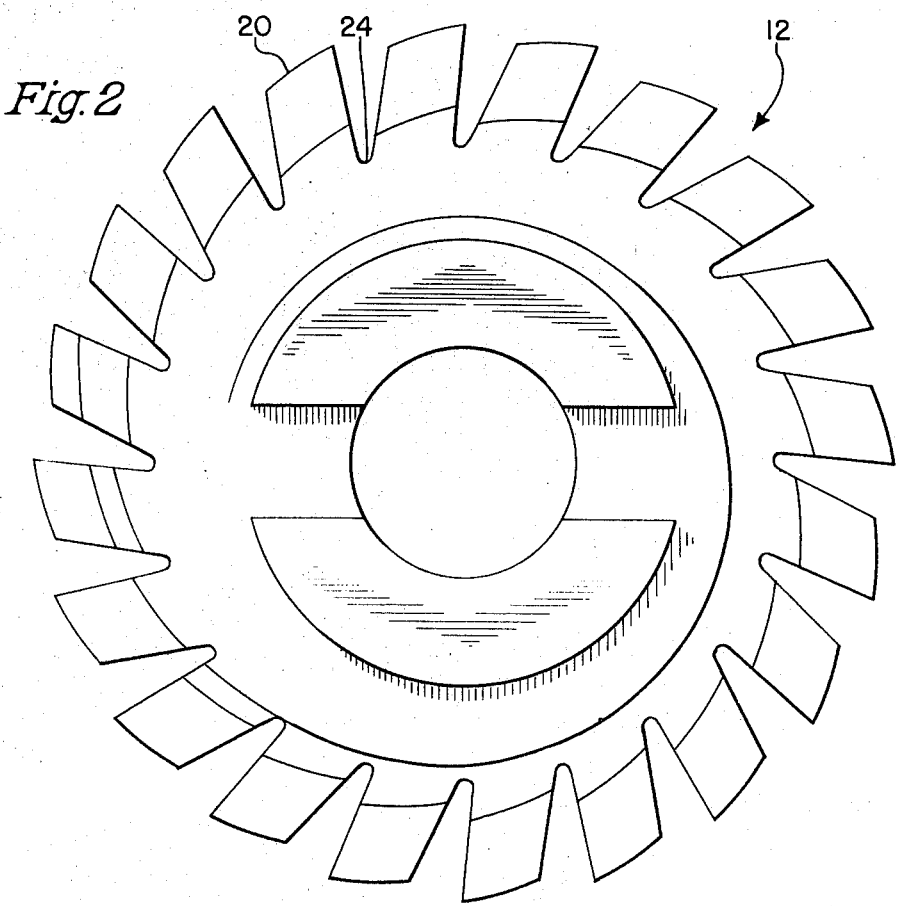
FIG. 2 is an end view of the leading or roughing section of the composite hob.
Figure 3:
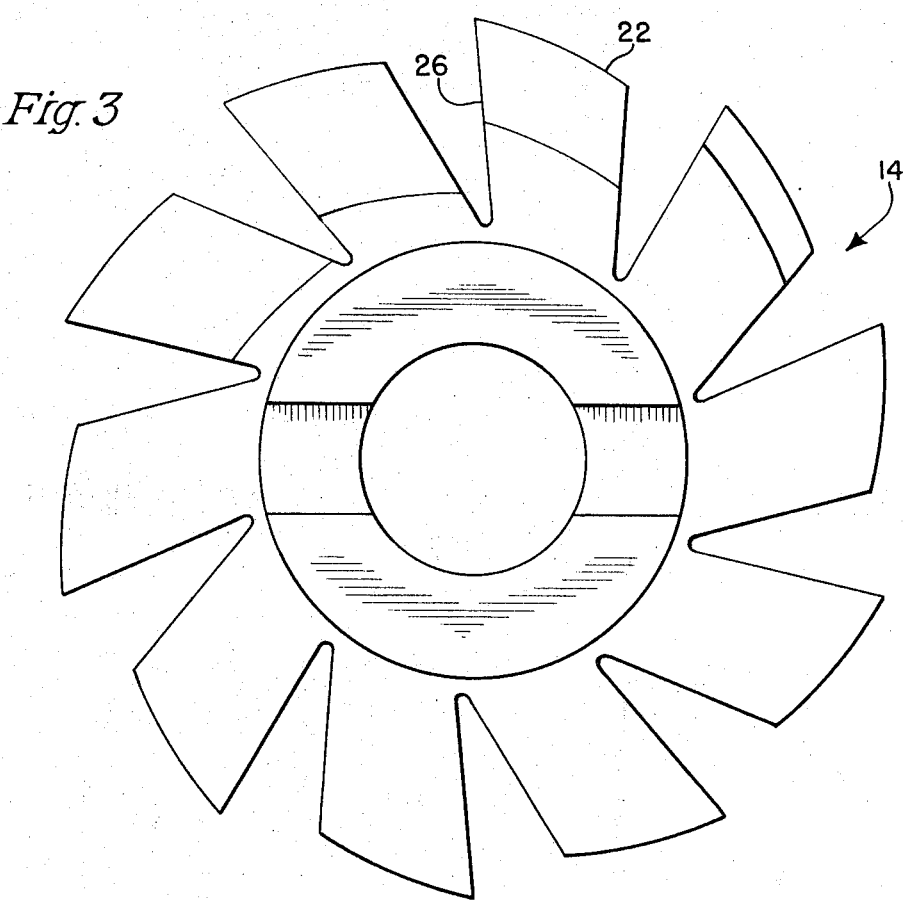
FIG. 3 is an end view of the trailing or finishing section of the composite hob.

Since most of the cutting work is done by the leading section 12, as many flutes or gashes and teeth as possible are used in this section. FIG. 2 shows 20 cutting teeth 20 and associated flutes 24 spaced about the periphery of the hob. In contrast to this number of teeth and flutes, FIG. 3 shows that the trailing or finishing section 14 of the composite hob includes 10 teeth 22 and associated flutes 26.

Figure 4:
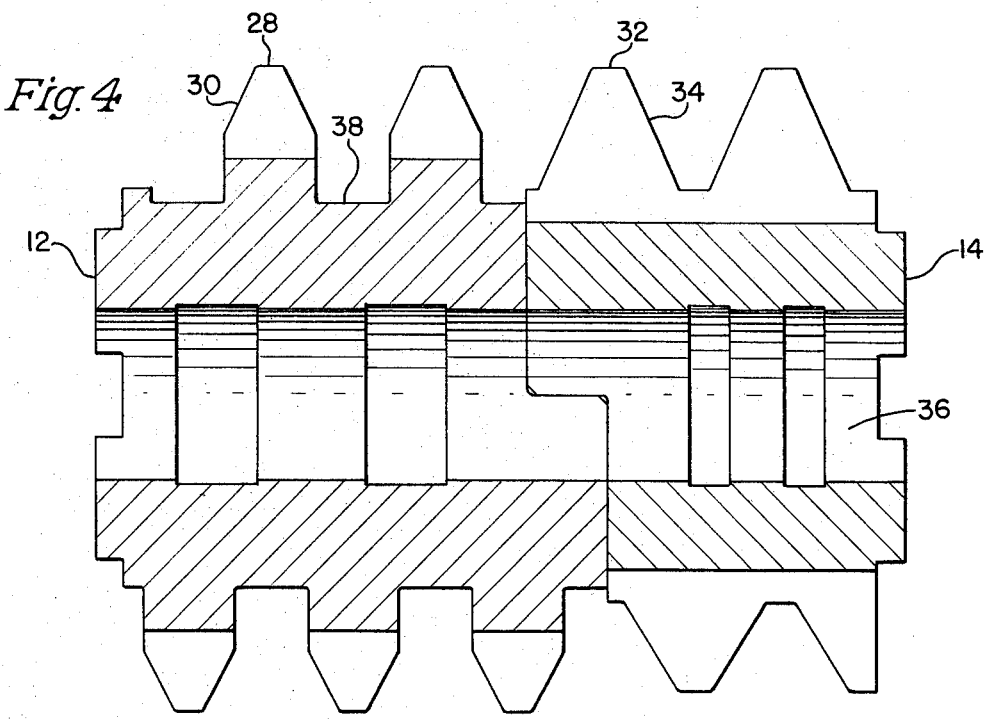
FIG. 4 is a cross-sectional view taken through the longitudinal axis of the composite hob when the two sections are assembled for roughing and finishing work.

Also, in accordance with the invention, the teeth 20 in the leading section are provided with a top land 28 having a cutting edge and two mutually inclined side faces 30 flanking said cutting edge. Since the outermost portion of the teeth, which includes the top lands and cutting edges, undergoes the most wear, the flank lengths may be shortened in this section. Thus, FIG. 4 shows teeth 20 being approximately one-half of the depth of the tooth form of teeth 22 in the finishing section 14. The leading section 12 should permit the full depth gear tooth to pass through and therefore may be provided with a clearance or non-relieved groove 38 below the pitch line of the hob.

To provide a smooth, balanced cutting, the top lands of all teeth are located approximately the same distance from the hob axis and are of approximately the same width.

The multiple-section hob 10 has the advantage that each section 12 and 14 could be made in somewhat conventional manner and subsequently mated for combined use. The leading section could possibly be made of a different material or hardness than the trailing section if specific wear control is necessary. The sharpening process used on such a composite hob may be conventional in that each section is sharpened separately as an individual item.

The interface between such a composite hob is particularly important. The simplest manner of interfacing two such sections would be simply abutting flat ends of respective sections. However, this would eliminate too many useful cutting edges by truncation. The preferred embodiment of this invention utilizes step faces 16 and 18 on sections 12 and 14 respectively. These abutting surfaces provide a firm interlock between the two sections of the hob. The abutment surfaces are shown to lie generally on a plane which includes the longitudinal axis of the hob.

While the step-like abutment surfaces are shown in the preferred embodiment to effectively mate the two sections without eliminating a large number of cutting edges, it should be recognized that other interfaces can be used, such as mating helical surfaces on each section. In operation, the compound hob 10 is provided with an axial bore 36 for conventional mounting on an arbor.

A tapered entering end may be used on the leading or roughing section to assure that the maximum cutting load will not be concentrated on a few end teeth but will be distributed over a larger area.

The composite hob of the present invention provides a tool which allows the major portion of the cutting work to be done by a leading section having many cutting edges incorporated in a shallow tooth form while still allowing a finished gear to be generated in a single pass of the hob by the utilization of a finishing section of full tooth form. This makes it possible to employ a finishing section for a large amount of work before resharpening is required. This presents a tremendous advantage and cost saving since the manufacture of such a finishing section requires great manufacturing care to produce accurate workpieces. The compound hob also permits replacement of only a portion of the hob should it be damaged because of adverse work conditions or handling. Thus, maximum life can be obtained from such a composite tool.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A compound hob which includes a leading section separably associated with a trailing section, the leading section constituting the roughing section of the hob and the trailing section constituting the finishing section of the hob, the leading section including a plurality of cutting teeth helically arranged about the longitudinal axis of the hob with a like plurality of generally longitudinally extending flutes spaced equally about the circumference of the leading section, the trailing section including a plurality of cutting teeth helically arranged about the longitudinal axis of the hob with a like plurality of generally longitudinally extending flutes spaced equally about the circumference of the trailing section, the helix of the cutting teeth on the trailing section being a continuation of the helix of the cutting teeth on the leading section and of the same helix angle, the number of flutes on the leading section being greater than the number of flutes on the trailing section providing a greater number of equally spaced cutting edges in the roughing section than on the finishing section, the cutting teeth on the hob each being formed of a top land and a pair of flank portions diverging therefrom, the flank portions on the teeth of the roughing section being of less length than the flank portions on the teeth of the finishing section, the top lands of all teeth on the hob being generally the same distance from the axis of the hob and generally of the same width, the abutting mating surfaces of the roughing and finishing sections being coupled by complementary interlocking surfaces.

2. A hob in accordance with claim 1 wherein the abutting surfaces comprise step-like portions.

3. A hob in accordance with claim 2 wherein the step-like portions include faces lying generally on a plane which includes the longitudinal axis of the hob.

4. A hob in accordance with claim 1 wherein the flute depths of the leading section are less than the flute depths of the trailing section.

5. A hob in accordance with claim 1 wherein the leading section is provided with a helical clearance groove extending below the flutes in the leading section.

* * * * *